Oct. 27, 1925.  1,558,776
W. G. BARRATT
TEAPOT AND COFFEEPOT PROVIDED WITH LOOSE LID
Filed Nov. 29, 1924   3 Sheets-Sheet 1
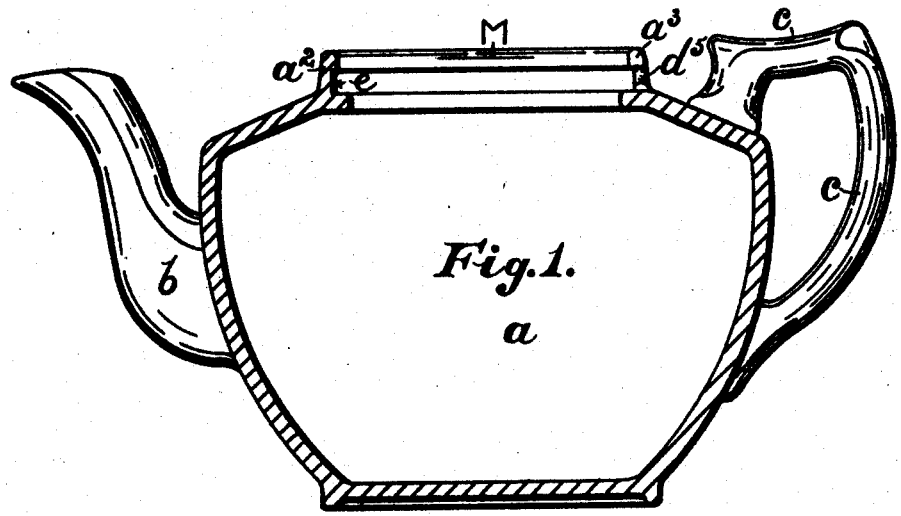
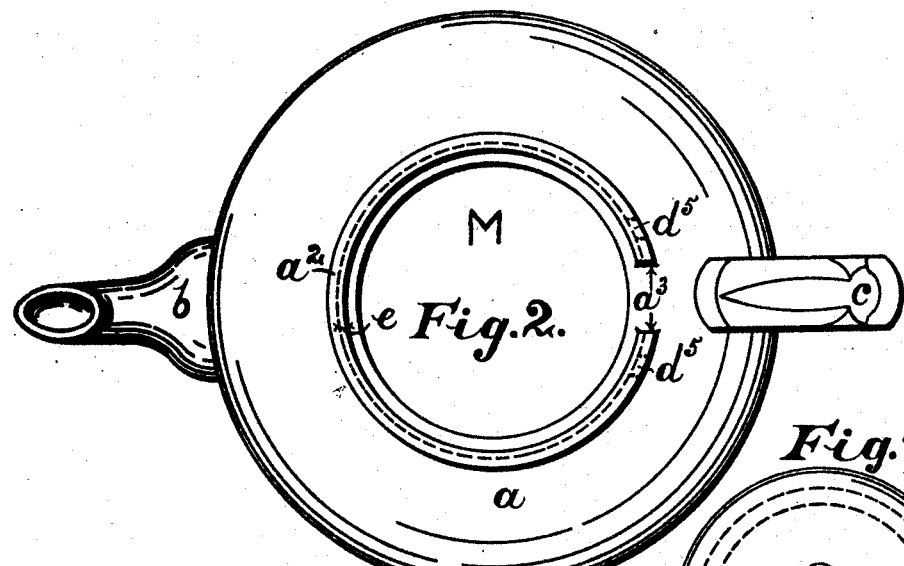
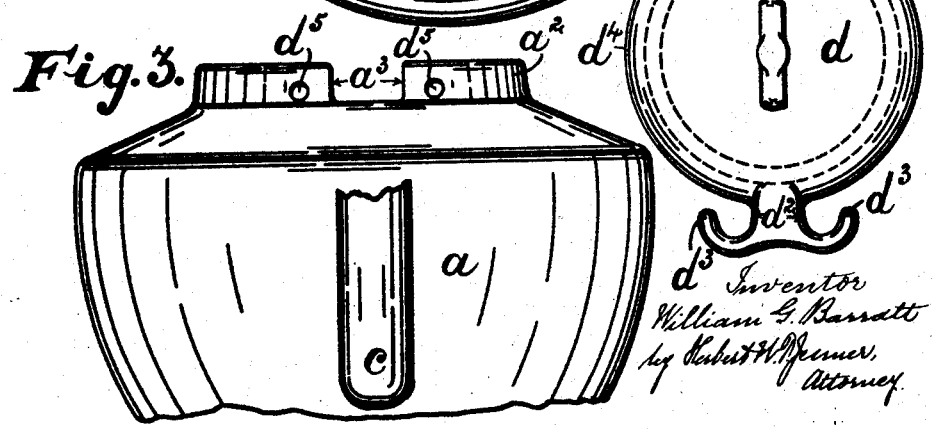

Oct. 27, 1925.  
W. G. BARRATT  
1,558,776  
TEAPOT AND COFFEEPOT PROVIDED WITH LOOSE LID  
Filed Nov. 29, 1924  
3 Sheets-Sheet 2

Inventor  
William G. Barratt  
by Herbert W. Jenner  
Attorney.

Oct. 27, 1925.  
W. G. BARRATT  
1,558,776  
TEAPOT AND COFFEEPOT PROVIDED WITH LOOSE LID  
Filed Nov. 29, 1924   3 Sheets-Sheet 3

Inventor  
William G. Barratt,  
by Herbert W. Jenner,  
Attorney.

Patented Oct. 27, 1925.

1,558,776

UNITED STATES PATENT OFFICE.

WILLIAM GEORGE BARRATT, OF BURSLEM, STOKE-ON-TRENT, ENGLAND.

TEAPOT AND COFFEEPOT PROVIDED WITH LOOSE LIDS.

Application filed November 29, 1924. Serial No. 752,997.

*To all whom it may concern:*

Be it known that I, WILLIAM GEORGE BARRATT, subject of the King of Great Britain and Ireland, and resident of Burslem, Stoke-on-Trent, in the county of Stafford, England, earthenware manufacturer, have invented certain new and useful Improvements in Teapots and Coffeepots Provided with Loose Lids (for which I have filed application in Great Britain by application for Patent No. 18,371, dated the 1st day of August, 1924), of which the following is a specification.

My invention relates to improvements in teapots and coffee pots provided with loose lids, the object being to construct a teapot or the like pouring vessel with means for retaining the lid or cover thereof in position when pouring of the tea or liquid is taking place.

My invention will be fully described with reference to the accompanying drawings.

Description of the drawings.

Fig. 1 is a sectional elevation of my improved teapot, the lid or cover being removed, Fig. 2 is a plan of same, Fig. 3 is an elevation of a portion of the teapot looking in the direction of the handle, Fig. 4 is a plan of the lid or cover, Fig. 11 is a sectional elevation of a further modification to be herein referred to.

In these figures $a$ is the teapot body, $b$ the spout thereof, $c$ the handle and $d$ the lid or cover.

Referring first to Figures 1 to 7, the body $a$ is constructed with an upstanding flange $a^2$ which is discontinued at $a^3$ as shown at Figs. 2 and 3 and is provided with a groove $e$ round its inner surface.

Figure 5:
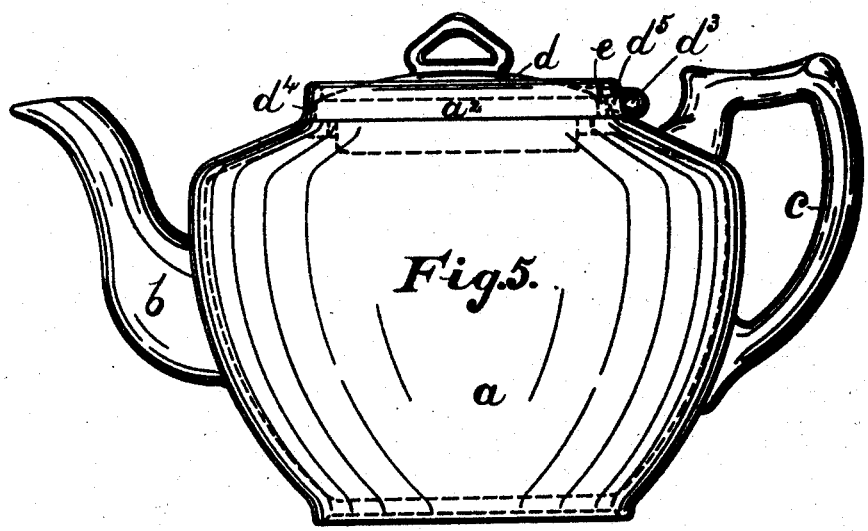
Fig. 5 is an elevation illustrating the teapot with the lid or cover in position.
Figure 6:
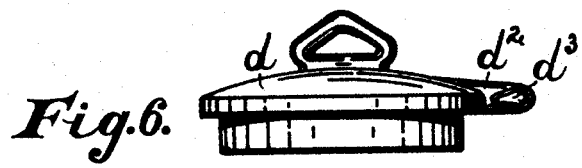
Fig. 6 is an elevation of the lid or cover.
Figure 7:
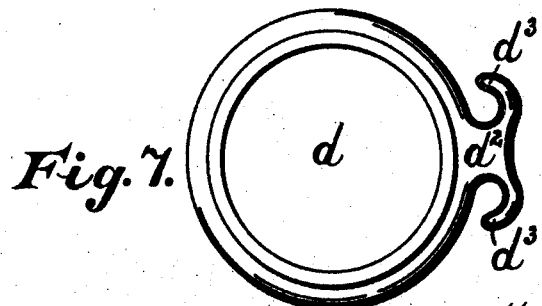
Fig. 7 is an inverted plan of the lid or cover illustrated at Fig. 6.

The lid or cover $d$ (see Figs. 4, 6 and 7) has a horizontal or approximately horizontal extension $d^2$ with side projections $d^3$, the said extension $d^2$ being of less width than the space $a^3$ in the upstanding flange $a^2$ of the teapot to enable it to pass therein. The lid or cover is placed into the mouth M of the teapot so that the extension $d^2$ on the lid or cover $d$ takes into the space $a^3$ in the upstanding flange $a^2$ and the side projections $d^3$ on the outside thereof. When the teapot is tilted to pour out the tea the lid or cover $d$ moves slightly forward, the front of the periphery $d^4$ thereof then takes into the groove $e$ in the upstanding flange $a^2$ and the horizontal side projections $d^3$ into horizontal holes $d^5$ in the flange $a^2$ as shown at Fig. 5 by which means the displacement or falling of the lid or cover $d$ during pouring is prevented.

Figure 8:
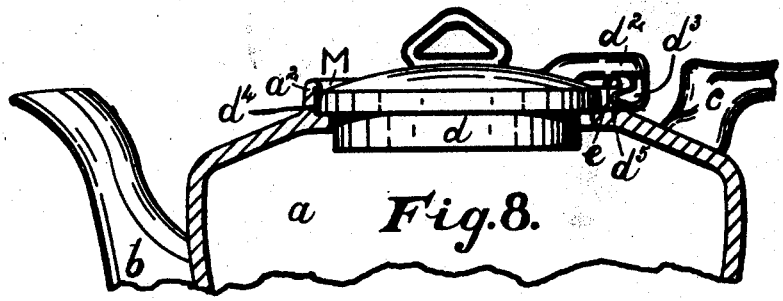
Fig. 8 is a sectional elevation of the upper portion of a teapot with the lid or cover in position, this being a modification to be herein referred to, Fig. 9 is a plan of the lid or cover illustrated in position at Fig. 8.

In the modification illustrated at Fig. 8 the upstanding flange $a^2$ is continuous there being no necessity to provide the space $a^3$ as the horizontal extension $d^2$ of the lid or cover $d$ (see Fig. 9) is slightly raised to take over the upstanding flange, the side projections $d^3$ being shaped to extend to a lower level to take into horizontal holes $d^5$ in the upstanding flange $a^2$ of the vessel.

Figure 9:
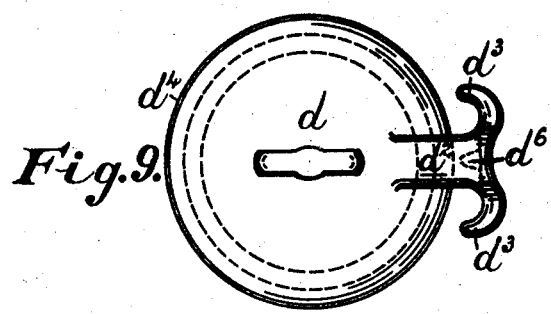
Figure 10:
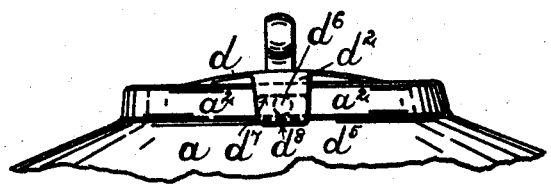
Fig. 10 is an elevation of the upper portion of a teapot with the lid or cover in position showing another modification.

In some cases the horizontal extension $d^2$ on the lid or cover $d$ may be provided with only one projection $d^6$ as shown in dotted lines at Fig. 9 and in Fig. 10 to engage the hole $d^5$ in the teapot flange $a^2$ or such projection may be of a wide character as shown dotted at $d^7$ (Fig. 10) to engage an elongated slot or recess $d^8$.

Figure 11:
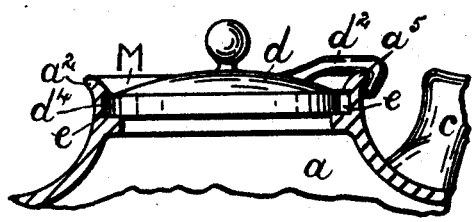

In the modification shown in Fig. 11 I dispense with the use of the hole or recess in the flange $a^2$ for the projection $d^6$ or $d^7$ to take into, and for this purpose the flange $a^2$ of the teapot is splayed or curved outwardly in the ordinary way and the extension $d^2$ of the lid or cover takes over the top edge $a^5$ of such flange $a^2$ and at the outside thereof, the front of the periphery $d^4$ of the lid or cover $d$ engaging the groove $e$ as shown on the drawings.

What I claim as my invention and desire to secure by Letters Patent is:—

1. A pouring vessel having a spout on one side, said vessel having also an upwardly projecting flange at its top provided with a groove extending around its inner side, and a cover slidable upon the top of the vessel and adapted to engage with the side portion of the said groove adjacent to the spout when the vessel is tilted to pour out its contents, said cover being provided with a laterally projecting member which engages with the said flange on the other side of the vessel from the spout and retains the cover in place when the vessel is tilted.

2. A pouring vessel having a spout on one side, said vessel having also an upwardly projecting flange at its top provided with a groove extending around its inner side and having also a vertical notch in its other side from the spout, and a cover slidable upon the top of the vessel and adapted to engage with the side portion of the said groove adjacent to the spout when the vessel is tilted to pour out its contents, said cover being provided with a laterally projecting member which engages with the said notch and is provided with means for engaging with the said flange to retain the cover in place when the vessel is tilted.

In testimony whereof I have hereunto set my hand.

WILLIAM GEORGE BARRATT.